No. 708,983. Patented Sept. 16, 1902.
J. BARTLETT.
OVERSHOE FOR HORSES.
(Application filed Apr. 17, 1902.)
(No Model.)
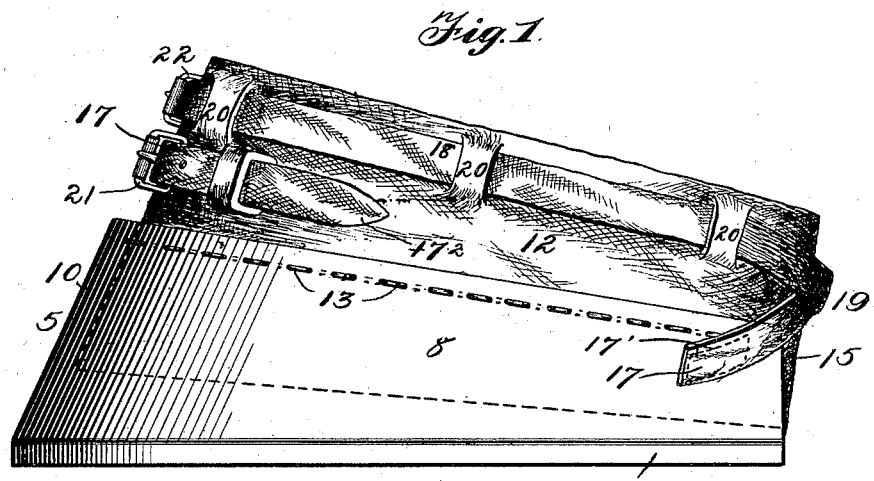
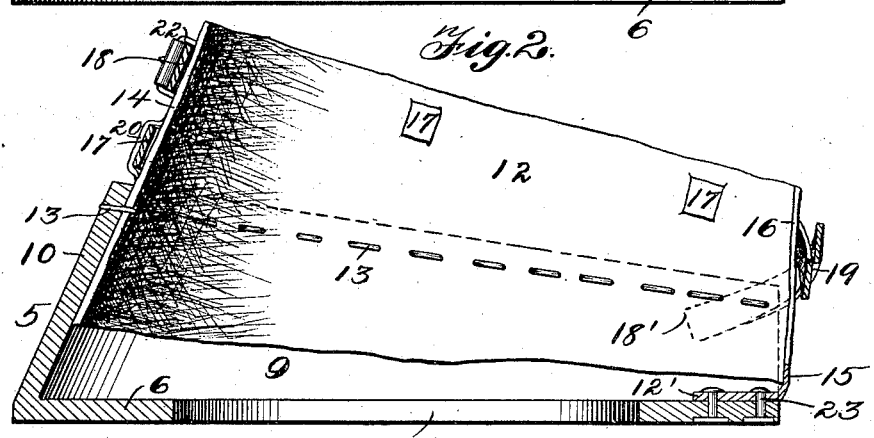
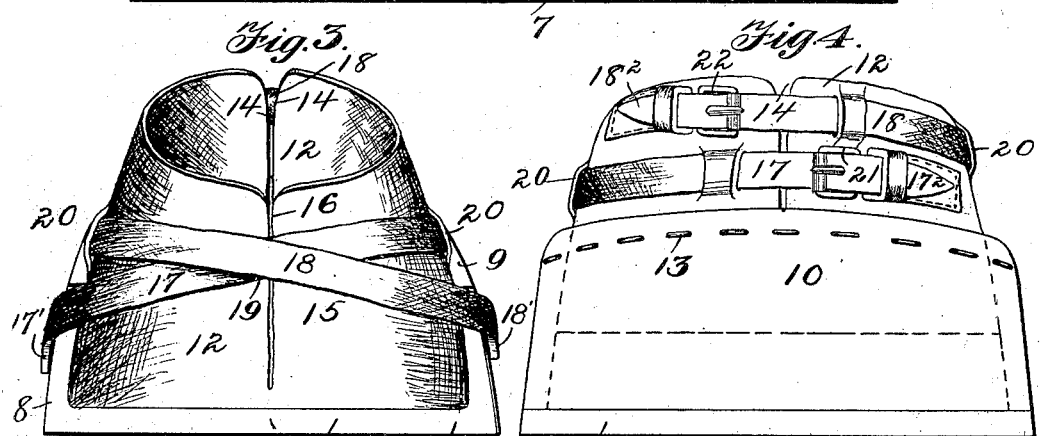
Witnesses:
F. G. Campbell.
Wm. P. Laraway.
Inventor:
John Bartlett.
By his Attorneys:
Blodgett & Peck

UNITED STATES PATENT OFFICE.

JOHN BARTLETT, OF BROOKLYN, NEW YORK.

OVERSHOE FOR HORSES.

SPECIFICATION forming part of Letters Patent No. 708,983, dated September 16, 1902.

Application filed April 17, 1902. Serial No. 103,349. (No model.)

*To all whom it may concern:*

Be it known that I, JOHN BARTLETT, a citizen of the United States, residing at Brooklyn, in the county of Kings and State of New York, have invented certain new and useful Improvements in Overshoes for Horses, of which the following is a specification.

My invention relates to overshoes or boots for horses, and has for its object the provision of a device of this class having improved means for securing said shoe or boot to the hoof of the animal.

A further object of the invention is the provision of a rubber overshoe or boot for horses which may be readily attached or detached and which has a strong but elastic "tread" portion and a flexible body portion securely fastened to the tread portion and carrying suitable fastening devices for securing the overshoe or boot to the hoof of the animal.

Further objects of the invention will be set forth in the detailed description which now follows.

In the accompanying drawings, Figure 1 is a side elevation of my improved overshoe or boot for animals. Fig. 2 is a longitudinal vertical section of the same. Fig. 3 is a rear elevation looking toward the left in Fig. 1, and Fig. 4 is a front elevation looking toward the right in Fig. 1.

Like numerals designate similar parts throughout the several views.

It is a desideratum in devices of this character to provide a shoe which may be readily attached to or detached from the hoof of an animal which will combine strength and good wearing qualities with lightness and which will readily conform to the hoofs of different sizes, and to this end I have provided a resilient base 5, comprising a tread portion 6, (the bottom of which may be corrugated, if desired,) having a longitudinal opening 7 formed therein, said tread portion carrying side walls 8 and 9 and the front wall 10, all of said walls being so constructed as to conform to the curvature of the hoof.

The means for securing the shoe to the hoof of a horse consists of a body portion or apron 12, which is secured by stitching or in any other desired manner, as at 13, to the base 5. This apron is of leather, canvas, or other flexible material, and forms a partial lining for the base, closing the rear of the shoe, and is continued along each of the side walls to the front of the shoe, where each of the side walls of the apron terminate a little short of the central portion of the shoe, as indicated at 14, and the wall 15 of the apron which closes the rear of the shoe is split at 16, these openings of the apron allowing it to be drawn tightly around the hoof.

The means for securing the apron 12 of the shoe to the hoof consist of straps 17 and 18, said straps being stitched or otherwise fastened to the rear portions of the side walls of the base, as illustrated at 17' and 18', and said straps being crossed at 19, as best illustrated in Figs. 2 and 3, and passing through loops 20 of the apron which serve to hold them in position are brought around to the front of the shoe, where their free ends $17^2$ $18^2$ are secured to buckles 21 and 22, respectively, carried by the apron. For securing the rear part of the apron to the base said apron has an extension 12', which is riveted at 23 to said base.

From the foregoing description it will be seen that in this improved overshoe or boot for horses means have been provided, in combination with a resilient base, for securely fastening the structure to the hoof of an animal in such a manner that the pressure of the fastening devices will be equally distributed over the entire hoof, which will prevent slipping of the shoe, and by having the apron constructed of pliable material, as described, said apron may be drawn tightly about the hoof by the straps 17 and 18 to prevent snow or ice from working its way into the shoe.

Having thus described my invention, what I claim is—

1. An overshoe or boot for animals comprising a tread portion; an elastic hoof-covering projecting from said tread portion; a flexible apron secured to said hoof-covering and to the tread portion, said apron being slit at its front and rear ends; and means for securing the apron, and thereby the overshoe, in place.

2. An overshoe or boot for animals comprising a resilient base having an opening and upwardly-extending walls; an apron secured to the inner sides of said walls and to the base, said apron being slit to enable it readily to conform to the outline of the hoof; straps secured to the walls of the base and passing through loops of the apron; and buckles attached to the apron and serving to retain the straps.

3. In an overshoe or boot for animals, the combination, with an elastic base having upwardly-extending walls conforming to the outline of the hoof, of a flexible apron secured to said walls at its front and sides and to the base at its rear portion, said apron being slitted at front and rear; straps secured to the rear sides of the flexible walls of the base; loops upon the flexible apron through which the straps pass; and buckles secured to the apron upon the reverse sides of the slit at the forward portions thereof.

4. An overshoe or boot for animals comprising a flexible base having a longitudinal opening in its tread portion, and also having upwardly-extending, elastic walls; a flexible apron secured to the inner side of said upwardly-extending walls and to the rear part of the tread portion; straps attached to the walls of the base at one end; loops carried by the flexible apron and through which said straps pass; and buckles for the reception of the front ends of said straps.

5. In an overshoe or boot for horses, the combination, with a resilient base, of an apron secured to said base, said apron being slitted as described; straps secured to said base, the straps being crossed at the rear of the shoe and carried around the side of the apron opposite the side upon which they are secured to the base and being brought around the front of the apron; and buckles carried by the apron and to which the free ends of the straps are attached.

In testimony whereof I affix my signature in presence of two witnesses.

JOHN BARTLETT.

Witnesses:
SAML. I. KEYES,
FRANK G. CAMPBELL.